(12) United States Patent
Berger et al.

(10) Patent No.: US 7,124,978 B2
(45) Date of Patent: Oct. 24, 2006

(54) SPIRALING DEVICE

(75) Inventors: Markus Berger, Sehnde (DE); Rainer Oehl, Grossburgwedel (DE); Klaus Binder, Sarstedt (DE)

(73) Assignee: Contitech Luftfedersysteme GmbH, Hannover (DE)

( * ) Notice: Subject to any disclaimer, the term of this patent is extended or adjusted under 35 U.S.C. 154(b) by 66 days.

(21) Appl. No.: 10/518,851

(22) PCT Filed: May 15, 2003

(86) PCT No.: PCT/DE03/01563

§ 371 (c)(1),
(2), (4) Date: Feb. 16, 2005

(87) PCT Pub. No.: WO2004/002718

PCT Pub. Date: Jan. 8, 2004

(65) Prior Publication Data
US 2005/0133656 A1 Jun. 23, 2005

(30) Foreign Application Priority Data
Jun. 28, 2002 (DE) ................................ 102 29 074

(51) Int. Cl.
*B65H 54/64* (2006.01)
(52) U.S. Cl. .................................................. 242/439.5
(58) Field of Classification Search ................ 242/438, 242/438.1, 439.2, 439.4, 439.6, 441.2, 441.4, 242/443, 443.1
See application file for complete search history.

(56) References Cited

U.S. PATENT DOCUMENTS

| | | | |
|---|---|---|---|
| 993,151 A * | 5/1911 | Campbell ................. 242/439.5 |
| 1,989,135 A * | 1/1935 | French et al. .................. 57/15 |
| 2,070,925 A * | 2/1937 | Rolfs et al. ............. 242/439.5 |
| 2,315,332 A | 3/1943 | Howe et al. |
| 3,344,592 A * | 10/1967 | Geisinger ........................ 57/3 |
| 4,067,362 A | 1/1978 | Jackman |
| 4,077,828 A * | 3/1978 | Strom ........................ 156/429 |
| 4,610,403 A * | 9/1986 | Goekler et al. ........... 242/439.5 |
| 4,612,759 A * | 9/1986 | Meijer ............................. 57/17 |
| 5,292,472 A | 3/1994 | Tompkins |
| 5,720,445 A * | 2/1998 | Sakurai et al. ........... 242/438.1 |
| 6,431,490 B1 * | 8/2002 | Monget et al. ............. 242/444 |

FOREIGN PATENT DOCUMENTS

| | | |
|---|---|---|
| DE | 31 09 365 | 9/1982 |
| DE | 38 24 757 | 2/1989 |
| GB | 873174 | 7/1961 |
| JP | 404266566 A * | 9/1992 ............. 242/439.5 |

* cited by examiner

Primary Examiner—Emmanuel M Marcelo

(57) ABSTRACT

A spiraling arrangement (1) for applying a spirally-shaped filament layer to an elongated carrier (2) which is drivable in the direction of the carrier longitudinal axis (X). The arrangement has a rotor (3), which is rotatable about the carrier longitudinal axis (X), and a plurality of filament bobbin carrier shafts (5) which extend in the direction of the carrier longitudinal axis (X). The carrier shafts (5) are arranged distributed on a circumscribed circle radius of the rotor (3) and are each configured to take up a plurality of filament bobbins (7). On one end face (6a) of the rotor (3), filament brake elements (10) are arranged distributed over the periphery and can be driven synchronously with respect to each other. The filaments (8) are taken off the filament bobbins (7) and are guided by filament guide elements (9) via the filament brake elements (10) and an annular comb (12), which encloses the carrier (2), onto the carrier (2).

13 Claims, 1 Drawing Sheet

SPIRALING DEVICE

This application is the national stage of International Application No. PCT/DE 2003/001563, filed May 15, 2003, designating the United States.

FIELD OF THE INVENTION

The invention relates to a spiraling arrangement for applying a spirally-shaped filament layer onto an elongated carrier which is advanceable in the direction of the carrier longitudinal axis. The spiraling arrangement has a rotor and a plurality of filament bobbin carrier shafts which are distributed on a circumscribed circle of the rotor and are each configured to take up a plurality of filament bobbins. The rotor is rotatable about the longitudinal axis and the filament bobbin carrier shafts extend in the direction of the carrier longitudinal axis.

BACKGROUND OF THE INVENTION

Dense filament layers are spiraled onto a plastic or rubber carrier by at least one spiraling arrangement especially for reinforcing rubber or plastic hoses or tubes with reinforcement layers. One such manufacturing method is, for example, described in German utility model 1928 736 and in DE 38 24 757 A1. Here, filaments are pulled off from a plurality of filament bobbins and are guided through bores onto an extruded plastic hose. The filament bobbins are arranged on the periphery of a circularly-shaped bobbin carrier and the bores are arranged radially in the bobbin carrier. The bobbin carrier rotates so that a spirally-shaped filament layer is applied to the plastic hose which is advanced along the rotational axis. A further spiraling arrangement is mounted behind the first spiraling arrangement and rotates in the opposite direction so that a further opposing filament layer is formed.

A further plastic layer is applied to these two filament layers with a further extruder.

The limited number of bores, which are present on the periphery of the spiraling arrangement, is disadvantageous. The number of filaments, which can be spiraled-on per spiraling arrangement, is limited and therefore also the density of the filament layer. The number of bores cannot be increased as desired.

In U.S. Pat. No. 5,292.472, an improved spiraling arrangement is disclosed wherein a plurality of bobbins are arranged on several circumscribed circle radii of a plate. The filament bobbins are accommodated by filament bobbin carrier shafts which are configured for each taking up three bobbins one next to the other.

The filaments of the filament bobbins are pulled off radially inwardly and are guided through filament guide struts with through-guiding bores into an extrusion head.

It is disadvantageous that the individual filament bobbins with the corresponding filaments are only accessible with difficulty so that the preparation time and the required preparation complexity are relatively great. In addition, a uniform filament tension of all filaments is not ensured to an adequate extent.

SUMMARY OF THE INVENTION

The object of the invention is therefore to provide an improved spiraling arrangement wherein the above disadvantages are avoided or reduced.

The object is achieved with the spiraling arrangement in accordance with the invention in that filament brake elements are distributed over the periphery at one end face of the rotor and are drivable synchronously with respect to each other. The filaments are taken off the bobbin coils preferably tangentially and are guided onto the carrier with filament guide elements via the filament brake elements and an annular comb which encloses the carrier.

With the arrangement of the filament brake elements and the annular comb at one end face of the rotor and with the filament bobbin carrier shafts at the periphery of the rotor, it can be ensured that the filaments, which are taken off the filament bobbins, can be guided in the same way with virtually the same deflecting angles and be charged with the same filament tension. In this way, it is ensured that the filament tension of a filament over time and the filament tensions of the filaments with respect to each other are uniform. With the tangential pull off of the filaments from the filament bobbins, it is additionally prevented that (as in overhead pull off) the filaments become tangled with each other when being pulled off and possibly form loops when loosening which could lead to a break of the filament thereby affecting the product in a negative manner.

With the arrangement of the spiraling arrangement of the invention, all filament bobbins and filaments are easily accessible and viewable so that the preparation of the spiraling arrangement and the monitoring are optimized.

The filament brake elements are preferably configured as cylindrically-shaped rotatable drums, so-called shaft feed wheel units, which have several filament take-up slots. The filament take-up slots extend each over the periphery of the drum and are spaced from each other in the direction of the longitudinal axis of the drum. In each case, one filament is wrapped multiple times about a filament take-up slot. In this way, all filaments, which are coupled to a filament brake element, are braked to the same extent and a uniform filament tension is ensured.

Each filament brake element can have its own drive/brake unit. Alternatively, several filament brake elements can, however, be coupled to each other, for example, via gear assemblies, chains or belts and can be driven together or braked in order to increase or decrease the filament tension.

Also, brake elements can be integrated into the bearings of the filament bobbins to generate the filament tension.

It is especially advantageous when the rotor is made up of separate circular segments and the filament brake elements of one particular circular segment are coupled to each other. In this way, the manufacture and maintenance of the rotor is simplified.

In order to ensure a uniform filament tension for all filaments, it is preferable to provide a central control unit for the filament brake elements with which the drive/brake units are so controlled that a uniform adjustment of the filament tensions of all filaments is ensured.

The filament guide elements, which are provided for deflecting the filaments at an angle of more than 30°, are preferably configured as deflecting rollers. In this way, it is ensured that the filament tension is affected as little as possible by the filament deflection.

The filament bobbin carrier shafts are preferably releaseably supported between the two end faces of the rotor spaced from each other. In this way, the filament bobbins can be easily exchanged and the preparation time for the spiraling arrangement can be further reduced.

The annular comb has a through-guide bore for the carrier at the center of the annular comb and a plurality of slits for taking up respective filaments. The slits extend radially from the outer periphery. In contrast to conventional bores for the through guidance of the filaments, the slits have the advantage that a plurality of filaments can be guided separately from each other on a relatively small periphery. In addition, the filaments can be easily placed in the slits and need not be threaded through the bores with difficulty.

In the annular comb, an inner sleeve is centrally arranged which tightly encloses the carrier. The inner edge of the inner sleeve, which adjoins the carrier at the inlet end, is radially so beveled that the filaments are guided from the slits in the annular comb over the radial bevel directly onto the carrier.

BRIEF DESCRIPTION OF THE DRAWING

The invention will now be described with reference to the single figure of the drawing (FIG. 1).

DESCRIPTION OF THE PREFERRED EMBODIMENTS OF THE INVENTION

Figure 1:
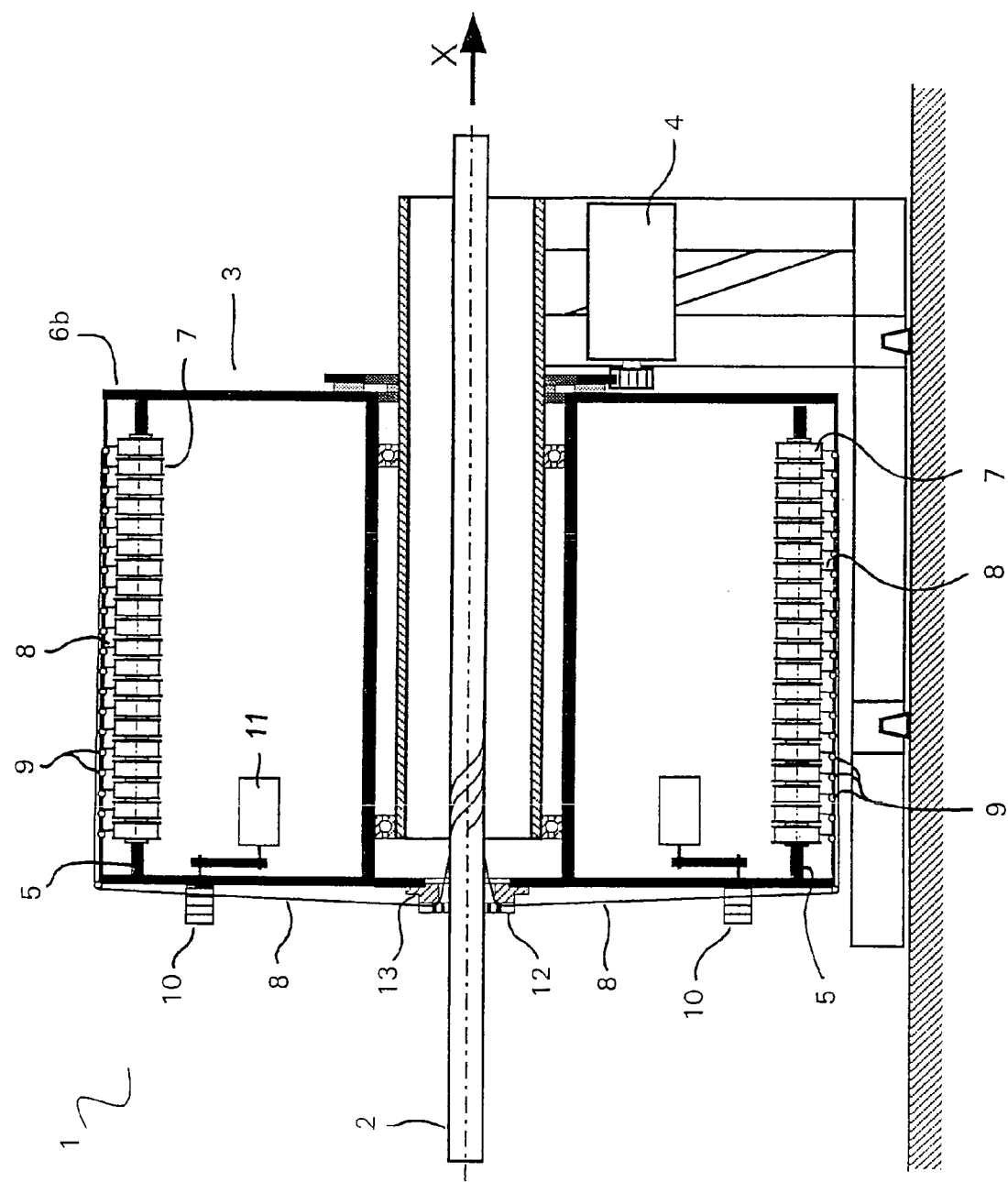
FIG. 1 shows a cross section view of the spiraling arrangement of the invention.

FIG. 1 shows a cross section of the spiraling arrangement 1. A carrier 2 (for example, cylindrical tubes arranged one behind the other) with at least one rubber layer, which is extruded on the tube, is guided through the center of the spiraling arrangement in the carrier longitudinal axis X of the carrier 2 and advanced. The spiraling arrangement 1 has a rotor 3, which is driven by a drive unit 4, and rotates about the longitudinal axis of the carrier 2. A plurality of filament bobbin carrier shafts 5 are distributed in at least one circumscribed circle radius of the rotor 3. The filament bobbin carrier shafts 5 extend between a first end face 6a and the second end face 6b of the rotor 3 and are supported preferably releasably in clamp holders. Each filament bobbin carrier shaft 5 is configured for accommodating a plurality of filament bobbins 7 which are rotatably journalled on the filament bobbin carrier shaft 5 in the direction of the carrier longitudinal axis X. The shafts of the filament bobbins extend likewise in the direction of the carrier longitudinal axis X.

The filaments 8, which are wound on the filament bobbins 7, are pulled off tangentially from the filament spools 7 and are guided by filament guide elements 9 to the first end face 6a of the rotor 3. A plurality of filament brake elements 10 are distributed about the periphery at the first end face 6a of the rotor 3. The filament brake elements 10 are coupled to at least one drive/brake unit 11 in such a manner that the filaments 8 can be influenced uniformly with respect to filament tension. For this purpose, the filament brake elements 10 are configured as cylindrically-shaped rotatable drums having several filament take-up slots which extend each over the periphery of the drum and are spaced from each other in the direction of the longitudinal axis of the drum. Each one filament 8 is wound several times about a filament take-up slot and is taken up by this slot. Several filament brake elements 10 are coupled to each other via a belt drive, chain drive or gear assembly drive and are driven or braked by a common drive/brake unit. The at least one drive/brake unit 11 is so controlled by a control unit that all filament brake elements 10 of the spiraling arrangement are synchronized to each other and a uniform filament tension is ensured.

The filaments are guided from the filament brake elements 10 radially inwardly to an annular comb 12. The annular comb 12 has a through-guided bore for the carrier in the center of the annular comb 12 as well as a plurality of slits for taking up respective ones of the filaments. The slits extend radially from the outer periphery of the comb ring 12. In the comb ring 12, an inner sleeve 13 is arranged which encloses the carrier 2. The inner edge of the inner sleeve 13 borders on the carrier at the take-in end and is radially beveled so that the filaments 8 can be guided through the slits over the radial bevel directly onto the carrier 2.

The invention claimed is:

1. A spiraling arrangement for applying a spirally-shaped filament layer onto an elongated carrier defining a longitudinal axis (X), the carrier being advanceable along said longitudinal axis (X), the arrangement comprising:
    a rotor rotatable about said longitudinal axis (X);
    a plurality of filament bobbin carrier shafts arranged distributed on a circumscribed circle of the rotor;
    a plurality of bobbin spools assigned to each of filament bobbin carrier shaft for accommodation thereon;
    a plurality of filament brake elements distributed over the periphery of a first end face of said rotor;
    means for driving said filament brake elements synchronously with respect to each other;
    an annular comb enclosing said carrier; and,
    filament guiding elements for taking off the filaments from said filament bobbins and guiding said filaments to said carrier via said filament brake elements and said annular comb.

2. The spiraling arrangement of claim 1, wherein the filament brake elements are configured as cylindrically-shaped rotatable drums having several filament take-up slots; and, each of the slots extending over the periphery of the drum and being spaced from each other in the direction of the longitudinal axis of the drum.

3. The spiraling arrangement of claim 1, wherein each filament brake element has a drive/brake unit.

4. The spiraling arrangement of claim 3, wherein the rotor is assembled of separate circular segments and the filament brake elements of each circular segment are coupled to each other.

5. The spiraling arrangement of claim 4, wherein the belt drives of the circular segments are coupled to each other.

6. The spiraling arrangement of claim 1, wherein several of said filament brake elements are coupled to each other via gear assemblies, chains or belts and are driven or braked in common.

7. The spiraling arrangement of claim 6, wherein a belt drive is influenced in each case by at least one drive/brake unit.

8. The spiraling arrangement of claim 1, further comprising a central control unit for the filament brake elements for uniformly adjusting the filament tensions of all filaments.

9. The spiraling arrangement of claim 1, wherein the filament guide elements, which are provided for deflecting the filament at an angle of greater than 30°, are configured as deflecting rollers.

10. The spiraling arrangement of claim 1, wherein the filament bobbin carrier shafts are releaseably supported at least one end face of the rotor.

11. The spiraling arrangement of claim 1, wherein the annular comb has a guide-through bore for the carrier at the center of the annular comb and has a plurality of slits for taking up corresponding ones of the filaments; the slits extending radially from the outer periphery; and, that an inner sleeve is arranged in the annular comb which closes the carrier; the inner edge of the inner sleeve is radially beveled and borders on the carrier at the intake end.

12. The spiraling arrangement of claim 1, wherein the filaments are pulled off tangentially from the filament bobbins.

13. The spiraling arrangement of claim 1, wherein said brake elements are arranged in bearings of the filament bobbins.

* * * * *